TELEVISION RECEIVER WITH COLOR SIGNAL GATE

Filed July 1, 1953 2 Sheets-Sheet 1

INVENTOR.
Robert D. Flood
BY W. H. Sprague
ATTORNEY

May 20, 1958 R. D. FLOOD 2,835,729

TELEVISION RECEIVER WITH COLOR SIGNAL GATE

Filed July 1, 1953 2 Sheets-Sheet 2

INVENTOR.
Robert D. Flood

BY W. H. Sprague
ATTORNEY 2,835,729

TELEVISION RECEIVER WITH COLOR SIGNAL GATE

Robert D. Flood, Haddonfield, N. J., assignor to Radio Corporation of America, a corporation of Delaware Application July 1, 1953, Serial No. 365,403

6 Claims. (Cl. 178—5.4)

This invention relates to apparatus for receiving color television signals and has particular reference to the circuits for processing color synchromizing signals.

In the type of color television system in accordance with the signal specifications proposed by the National Television System Committee (NTSC) on February 2, 1953, a brightness or luminance signal having the general character of a conventional black and white televison signal is transmitted together with a phase- and amplitude-modulated subcarrier wave having a nominal frequency which corresponds to one of the higher luminance signal frequencies. These video signals are transmitted, together with the usual synchronizing signals for effecting synchronous deflection of an electron beam at both horizontal and vertical frequencies, and, in addition, with a color synchronizing signal. The color synchronizing signal is a burst of several cycles of a wave having the color subcarrier frequency and is transmitted on the back porch of the horizontal synchronizing signals.

At a receiver in such a color television system, it is necessary to separate the burst color synchronizing signal from the remainder of the composite television signal so that it may be used for phase comparison with the output of a reference frequency oscillator, the output of which is employed to synchronously demodulate the color subcarrier wave for the recovery of the color representative intelligence signals. Also, at such a receiver, it is customary to separate the color subcarrier wave and its side band frequencies from the remainder of the composite video signal so that it may be synchronously demodulated. The result of the synchronous demodulation of the color subcarrier wave are so-called "color difference" signals which, when combined with the luminance or brightness signal, produce respective signals representative of the primary colors in which the image reproduction is to be effected. The combined brightness and color difference signals are impressed upon the image reproducing apparatus respectively as three different video signals representing the image colors.

In the impression of the color signals upon the image reproducing apparatus, it is necessary, as in conventional black and white receivers employing A.-C. coupled video amplifiers, to effect a so-called D.-C. restoration or black level setting. In such color receivers, as in conventional black and white receivers, the D.-C. restorers connected at the respective inputs of the image reproducing apparatus for the different colors function to effect the desired level setting in response to the peaks or tips of the horizontal and vertical synchronizing signals.

It has been found that the demodulation of the burst color synchronizing signals at least in certain of the color representative channels produces signals which exceed in amplitude the peaks of the horizontal and vertical sync signals. If such demodulated burst signals were to be impressed upon the D.-C. restorers, malfunctioning of such apparatus would result, since the level at which the image reproducing apparatus would be required to function would not correspond to true black level of the image to be reproduced.

Still another function of the burst synchronizing signal is to control the operation of the synchronous color subcarrier wave demodulating apparatus for proper response to either color television signals of the character employed according to the proposed NTSC signal specifications or to conventional black and white video signals. In the case of a color signal, the burst synchronizing signal is present and in the case of a black and white signal, it is absent. It, accordingly, is desired that the synchronous demodulating apparatus be rendered operative when color television signals are being received and inoperative when black and white signals are being received.

Accordingly, it is an object of the present invention to provide improved apparatus for suitably utilizing the burst color synchronizing signal in a color television receiver of the type adapted to operate in a system in accordance with the presently proposed NTSC standards.

Another object of the invention is to provide novel and improved apparatus for rendering unresponsive the color signal processing circuits of a color television receiver of signals in accordance with the presently proposed NTSC signal specifications during any period in which the burst color synchronizing signal is being received.

Still another object of the invention is to simultaneously render one circuit responsive and another circuit unresponsive to the burst color synchronizing signal and, at the same time, to effect independent amplification of the burst color synchronizing and chrominance signals.

In accordance with the present invention, a color television receiver adapted to operate in a system in accordance with the presently proposed NTSC signal specifications is provided with gating devices respectively in the color subcarrier wave demodulating circuit and in the color subcarrier reference wave synchronizing circuit. The demodulator circuit gate is normally open and the synchronizing circuit gate is normally closed. Both of these gating devices are concurrently operated to their respective opposite states in response to a control signal occurring substantially simultaneously with the burst color synchronizing signals. By such means, the burst color synchronizing signal is prevented from traversing the synchronous demodulating apparatus and at the same time it is impressed upon the phase detecting apparatus by means of which the local color subcarrier wave reference frequency oscillator is maintained in synchronism and in phase with the received color subcarrier wave.

In accordance with a feature of the invention, the burst and color signal gating devices are intercoupled in such a manner that one of them biases the other so that conduction in the one effects nonconduction in the other, and vice versa. In such a case, the one gating device responds to the control signal.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

Figure 1:
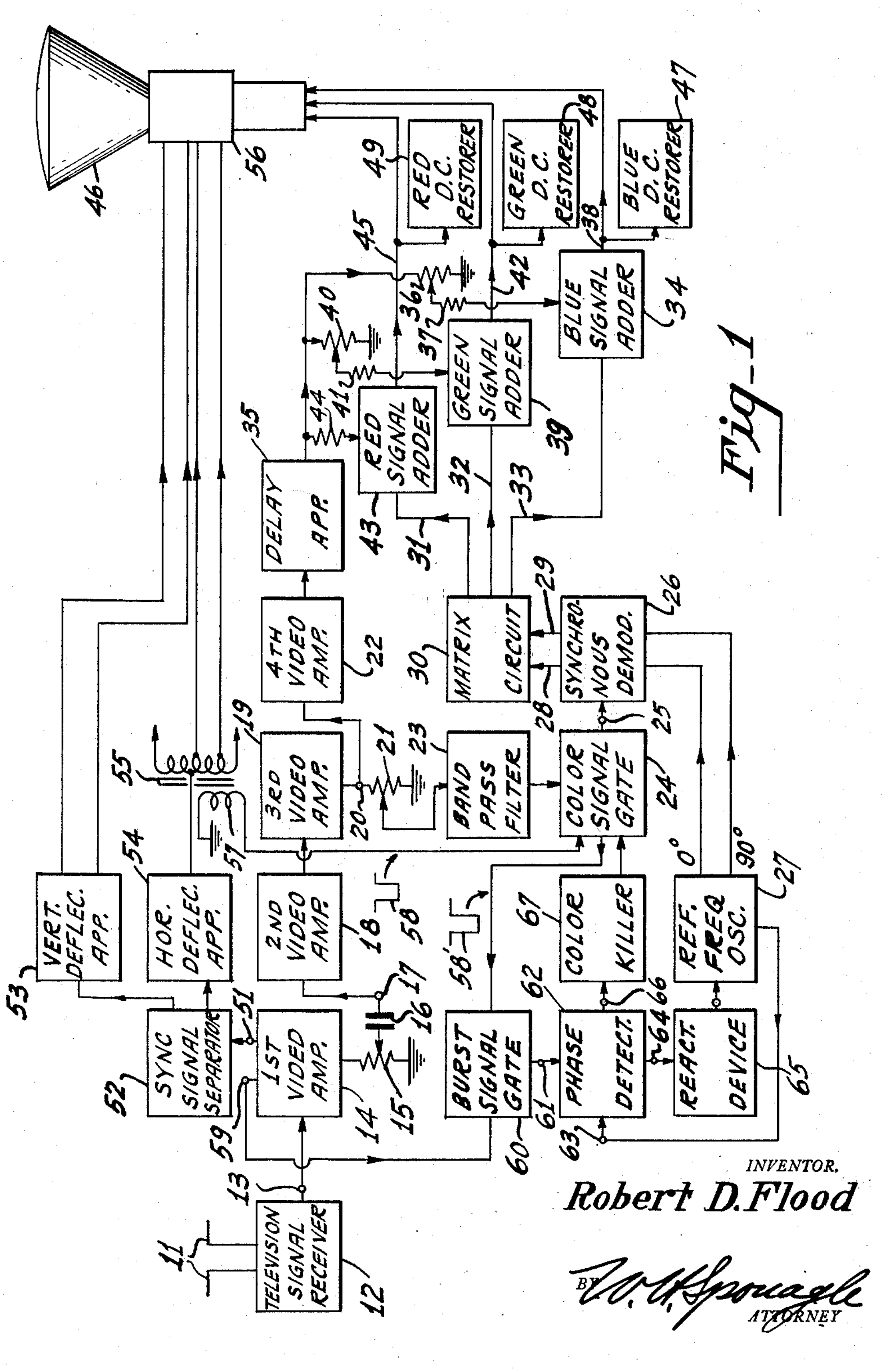
Figure 1 is a block circuit diagram of a representative form of color television receiver embodying the present invention.

Reference first will be made to Figure 1 of the drawings for a general description of a television receiver embodying the invention. The composite color television signal in accordance with the presently proposed NTSC signal specifications is received by an antenna 11 and is impressed upon a television signal receiver 12. The television signal receiver may be entirely conventional including, for example, R. F. and I. F. amplifiers, a frequency converter or first detector and a signal or second detector. It, therefore, will be understood that there is derived at the output terminal 13 of the receiver 12 a composite television signal in accordance with the presently proposed NTSC signal specifications. This signal accordingly includes a brightness or luminance signal component covering a band of frequencies of approximately 4 megacycles and made up of predetermined percentages of the red, green and blue color representative signals derived from a subject. In addition to the brightness or luminance signal component, the video signal also includes a chrominance signal component consisting of a phase- and amplitude-modulated color subcarrier wave having a nominal frequency of approximately 3.58 megacycles. The composite color video signal includes substantially all of one and a portion of the other of the sidebands of the color subcarrier wave. Additionally, the composite signal developed at the output terminal 13 includes the usual horizontal and vertical synchronizing signals. Finally, the signal also includes the burst of the color subcarrier wave frequency on the so-called back porch of the horizontal synchronizing signal waveforms.

The composite color television signal developed at the terminal 13 is impressed upon a first video amplifier stage 14. One output circuit with which the amplifier 14 is provided includes a potentiometer 15 preferably connected in the cathode circuit of an electron tube forming part of the first video amplifier stage and employed as a contrast control of the reproduced image. The potentiometer 15 is coupled by means including a capacitor 16 to the input terminal 17 of a second video amplifier stage 18, the output of which is, in turn, coupled to the input of a third video amplifier stage 19. The output circuit including terminal 20 of the third video amplifier stage also includes a potentiometer 21 preferably coupled in the cathode circuit of an electron tube forming part of the third video amplifier stage and employed as a chroma control by which to adjust the amplitude of the chrominance signal which is to be impressed upon the synchronous demodulators. Also, the output terminal 20 of the third video amplifier stage 19 is coupled to a fourth video amplifier stage 22.

Before describing the remainder of the luminance signal channel, a description will be given of the chrominance signal channel which is derived from the potentiometer 21 in the output circuit of the third video amplifier stage 19. The movable contact of the potentiometer 21 is coupled to a band pass filter 23. Generally, this filter is designed to pass frequencies within a band of from 2 to 4 megacycles. It is within this band of frequencies that the subcarrier wave and its sidebands lie. The band pass filter 23 is coupled to a color signal gating device 24. It will be understood that this device is normally operative to transfer signals from the band pass filter 23 to an output terminal 25. It will also be understood that the filter 23 alternatively, may follow the color signal gate 24.

The output terminal 25 is coupled to synchronous demodulating apparatus 26. It will be understood that usually the synchronous demodulating apparatus comprises two demodulators of the synchronous type in each of which the color subcarrier wave, together with its sidebands, are mixed with different phases of the reference frequency corresponding to the color subcarrier wave frequency. In the present case, the reference frequency oscillator 27 will be understood to operate with satisfactory stability at a frequency of substantially 3.58 megacycles corresponding to the color subcarrier wave frequency. Also, as indicated, there is derived from the oscillator, or auxiliary apparatus employed therewith, two different quadrature phases of the reference frequency wave. For convenience of reference, these two quadrature phases have been designated as 0° and 90°. As indicated, therefore, it will be understood that the synchronous demodulating apparatus functions in response to the color subcarrier wave signals developed at the terminal 25 in conjunction with two quadrature phases of the reference frequency wave derived from the oscillator 27 to produce two signals in the output circuits 28 and 29 respectively which correspond to the signals which were originally modulated on the color subcarrier wave at the transmitter.

The character of the demodulated signals in the output circuits 28 and 29 of the demodulating apparatus 26 will depend upon the phase relationship of the quadrature components of the reference frequency wave derived from the oscillator 27 relative to the phase of the burst color synchronizing signals. In the case where the demodulating apparatus 26 functions in accordance with the quadrature phase components related by 90° and 180°, respectively, to the burst frequency, the signals produced in the output circuits 28 and 29 correspond respectively in a general way to color difference signals. Such color difference signals, while not precisely representative of the subject color, may be combined with the luminance signal so as to produce color representative signals which may be employed to operate image reproducing apparatus with sufficient fidelity to provide satisfactory results.

However, since in accordance with the presently proposed NTSC signal specifications the color subcarrier wave is modulated with quadrature phase components which are delayed respectively relative to the burst frequency by angles of 57° and 147°, a more faithful reproduction may be effected by operating the synchronous demodulating apparatus 26 by means of quadrature phase components of the reference frequency wave derived from the oscillator 27 which bear this angular relationship to the burst frequency. In such a case, the signals produced in the output circuits 28 and 29 of the demodulating apparatus 26 are not truly color difference signals, but are generally referred to as "I" and "Q" signals.

In order to produce true color difference signals from such "I" and "Q" signals, the demodulator output circuits 28 and 29 are coupled to a matrix circuit 30. This circuit functions to mix proper percentages and polarities of the "I" and "Q" signals derived from the demodulator output circuits 28 and 29 in accordance with the relationships established by the NTSC proposed signal specifications so as to produce in the respective output circuits 31, 32 and 33 blue, green and red color difference signals.

The blue color difference signal produced in the matrix output circuit 31 is impressed upon a blue signal adder 34. There also is impressed upon the blue signal adder a certain percentage of the luminance signal. This latter signal is derived from a delay device 35 coupled to the output of the fourth video amplifier stage 22. The delay device is necessary to insert a suitable time delay in the luminance signal channel to correspond with the time delay produced in the chrominance signal channel by reason of the filter apparatus, such as the band pass filter 23. Accordingly, the luminance signal is made to have the same phase as the color difference signals for combination in the signal adding apparatus. The desired percentage of the brightness signal for combination with the blue color difference signal is determined by the adjustment of a potentiometer 36 and is impressed upon the blue signal adder through a series resistor 37. The blue signal adder 34 is a device which performs an algebraic addition of the blue color difference signal and the luminance signal. Such an adder may comprise an electron tube, for example, upon the input circuit of which both of these signals to be added are impressed and the sum of which is developed in the output circuit of the tube. Accordingly, a blue color representative signal is produced in the output circuit 38 of the blue signal adder 34.

In a similar manner, the green color difference signal produced in the matrix output circuit 32 is impressed upon a green signal adder 39 for combination with the luminance signal impressed upon the green adder by means including a potentiometer 40 for properly proportioning the luminance signal and a series resistor 41. As a result, a green representative color signal is developed in the output circuit 42 of the green adder 39.

In a like manner ,the matrix output circuit 33 is coupled to a red signal adder 43 for the impression thereon of the red color difference signal. The luminance signal is impressed upon the red adder by means including a series resistor 44. A red representative color signal is produced in the output circuit 45 of the red adder 43. The reason that the entire luminance signal is impressed upon the red adder, whereas smaller percentages thereof are impressed upon the blue and green adders, is that a red signal of greater magnitude is required to energize the red light producing apparatus of the image reproducing device.

The image reproducing device is a color kinescope 46. In the present instance, it will be assumed that the image reproducing device is a tri-color kinescope of the same general type as that described in a paper of H. B. Law titled "A three-gun shadow-mask color kinescope" and published in the Proceedings of the I. R. E., vol. 39, No. 10, October 1951, at page 1186. Such a color kinescope also forms the subject matter of U. S. Patent No. 2,595,548, granted May 6, 1952, to A. C. Schroeder and titled "Picture Reproducing Apparatus."

Such a kinescope includes three electron guns, or their equivalents, by which to produce three different electron beams which, upon impingement of a luminescent screen, effect the production of red, green and blue colored light, respectively. Accordingly, the blue color signal produced in the blue adder output circuit 38 is impressed upon a suitable electrode of the blue electron beam producing gun of the tri-color kinescope 46. In a similar manner, the green and red adder output circuits 42 and 45 are coupled respectively to the green and red electron guns of the tri-color kinescope 46.

In a somewhat conventional manner, the electron gun input circuits coupled respectively to the blue, green and red adder output circuits 38, 42 and 45 have connected thereto blue, green and red D.-C. restorers 47, 48 and 49. It will be understood that the D.-C. restorers are conventional apparatus including such components as a capacitor and a diode and arranged for operation to establish substantial cut-off of the associated electron beams in response voltages corresponding to the black representative video signals. The D.-C. restorers function to produce this type of result in response to the tips or maximum excursions of the sync signals forming part of the composite color television signal impressed upon the tri-color kinescope 46.

The color television system embodying the present invention also is provided with generally conventional apparatus for controlling the deflection of the electron beam components of the tri-color kinescope 46 so as to scan the usual substantially rectangular raster at the luminescent screen thereof. For this purpose, the composite color television signal produced at an output terminal 51 of the first viedo amplifier stage 14 is impressed upon a sync signal separator 52. This apparatus may be of a conventional type and functions to separate the horizontal and vertical synchronizing signals from one another and also from the video signal component of the composite signal. The vertical sync pulses are impressed upon vertical deflection apparatus 53 which functions in a conventional manner to produce a substantially sawtooth wave at vertical or field deflection frequency. In a somewhat similar manner, the separated horizontal sync signals are impressed upon horizontal deflection apparatus 54 for the production of a substantially sawtooth wave at horizontal or line deflection frequency. The horizontal deflection wave is impressed upon an output transformer 55. It will be understood that the vertical deflection circuit may also include a similar output transformer. The vertical and horizontal frequency sawtooth waves are impressed upon associated winding of a deflection yoke 56 with which the tri-color kinescope 46 is provided. By such means, the desired raster scanning deflection of the electron beam components is effected.

The horizontal deflection output transformer 55 also is provided with an auxiliary winding 57. This winding functions to develop pulses 58 of negative polarity during the retrace periods of the horizontal deflection system. The pulses 58 are employed in accordance with this invention to control the operation of the two gating devices including the color signal gate 24 in a manner to be described presently.

The frequency and phase control of the reference frequency oscillator 27 is effected by means of the burst color synchronizing signal. It is necessary to separate the burst signal from the remainder of the composite color television signal in order to effect this control. Accordingly, the composite color television signal developed at another output terminal 59 of the first viedo amplifier stage 14 is impressed upon a burst signal gate 60. This gate normally is closed so that the signal which is impressed upon its input circuit is not transferred to the output circuit. The burst signal gate 60 is momentarily opened periodically in response to the impression upon the control circuit thereof of control pulses 58' derived initially from the horizontal deflection circuit.

The output of the burst signal gate 60 is coupled to one input terminal 61 of a phase detector 62. The reference frequency wave derived from the oscillator 27 is impressed upon another input terminal 63 of the phase detector. Accordingly, during horizontal retrace intervals following the reception of the horizontal sync pulses, the burst signal gate 60 is momentarily rendered conducting to impress upon the phase detector input terminal 61 the burst of color synchronizing signal. The burst signal is thus compared in phase with the reference frequency wave impressed upon the other input terminal 63. Any difference in phase between these two waves is detected and effects the development at an output terminal 64 of the phase detector of an error voltage which is representative of the sense and magnitude of the phase deviation.

The phase error voltage developed at the output terminal 64 of the phase detector 62 is impressed upon a reactance device 65 which may be of a conventional character in a manner to effect a variation of reactance in correspondence with the voltage derived from the phase detector 62. The reactance device thereby controls the phase and frequency of the reference frequency oscillator 27 to which it is coupled in a conventional manner.

The burst color synchronizing signal also is developed at another output terminal 66 of the phase detector 62. This terminal is connected to color killer apparatus 67. The output of the color killer apparatus is connected to a control circuit of the color signal gate 24 so as to control its operation in response to the presence or absence of a burst synchronizing signal in the received composite color television signal. During the times that the burst color synchronizing signal is being received, the color killer apparatus 67 functions to maintain the color signal gate 24 in an operative or conducting condition so that, so far as its control of this gate is concerned, the signals impressed upon it from the band pass filter 23 are transferred to its output circuit including the terminal 25. When the burst color synchronizing signal is absent from the received composite television signal, such as in the case when only black and white signals are being received, the color killer apparatus 67 functions to render the color signal gate 24 substantially non-conducting so that no signals are developed at the output terminal 25. By such means, it is seen that the entire chrominance signal channel is rendered inoperative so that the color kinescope 46 responds only to the luminance signals which correspond essentially to black and white video signals.

The color signal gate 24 also is momentarily rendered non-conducting in response to the gate control signal pulses 58 derived from the horizontal deflection circuit. This momentary interruption of the circuit through the gate 24 occurs during the period in which the burst color synchronizing signal is being received. By such means, it is seen that this signal is prevented from being transferred to the output terminal 25 from which it would be impressed upon the demodulating apparatus of the chrominance signal channel. As previously indicated, the demodulation of the burst color synchronizing signal may produce a false operation of the D.-C. restorers 47, 48 and 49.

Figures 2, 3:
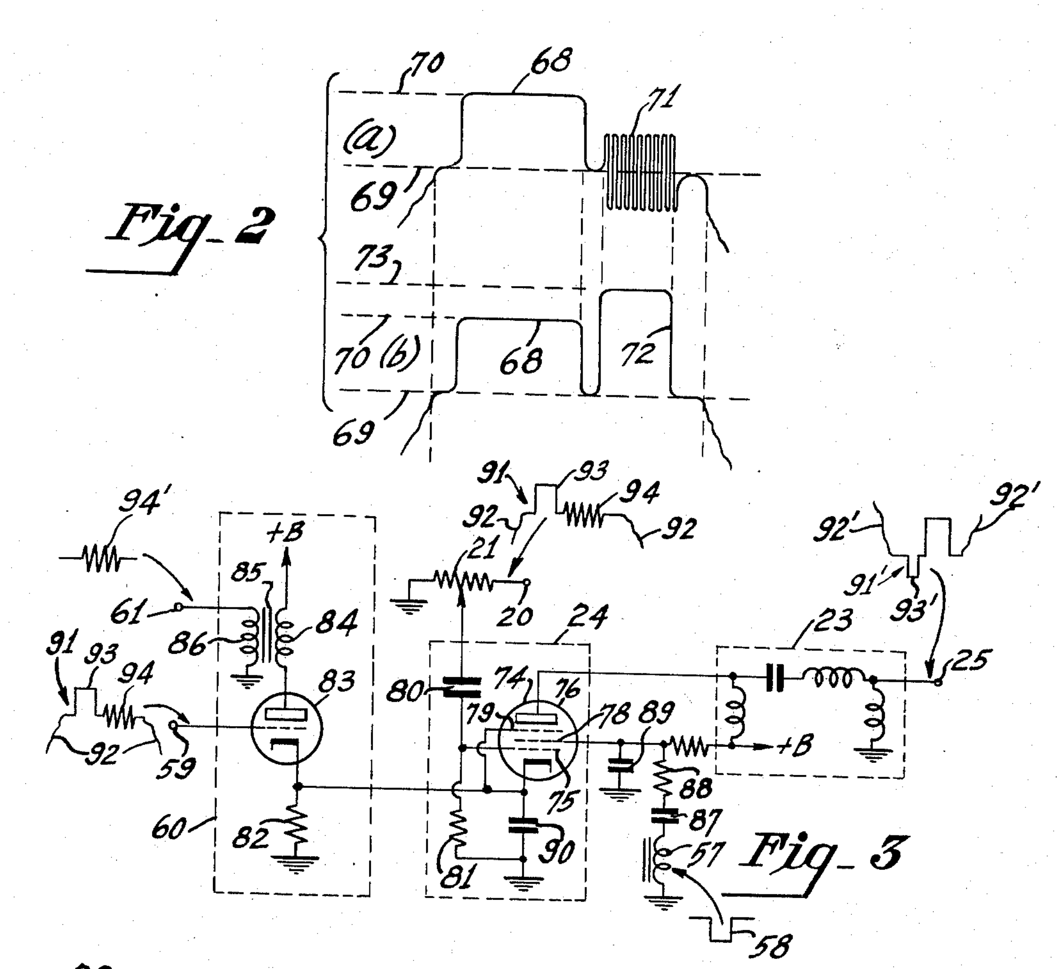
Figure 2 shows waveforms of typical synchronizing signals including the color synchronizing burst signal for reference in explaining the need for the present invention.
Figure 3 is a schematic circuit diagram of only that portion of the receiver shown in the block diagram of Figure 1 which embodies an illustrative form of the present invention; and, Figure 4 is a fragmentary schematic circuit diagram of a modified form of the invention.

The manner in which such false operation of the D.-C. restorers can occur may be more readily seen from the waveforms of Figure 2. In Figure 2*a*, the horizontal sync pulse 68 extends from black level amplitude 69 to a super black amplitude level 70. The D.-C. restorers functioning in a conventional manner, tend to set themselves in response to the horizontal sync pulse amplitude 70 so that the electron beam components of the tri-color kinescope 46 are effectively blanked in response to signals having an amplitude 69 or greater. Figure 2*a* also indicates the burst color synchronizing signal 71 which consists of several cycles of the color subcarrier wave frequency and has an A.-C. axis coinciding substantially with the black level amplitude 69.

By referring now to Figure 2*b*, there is a representation of a typical signal which might be impressed upon one or more of the D.-C. restorers 47, 48 and 49 of Figure 1 in the event that the burst color synchronizing signal 71 of Figure 2*a* were to be demodulated by the apparatus in the chrominance signal channel. The pulse 72 represents the demodulation signal corresponding to the burst color synchronizing signal 71 of Figure 2*a*. It is seen that the pulse 72 extends to an amplitude level 73 which is somewhat in excess of the maximum amplitude level 70 of the horizontal sync pulse 68. The impression of such a signal upon one or more of the D.-C. restorers would cause them to respond to a signal having an amplitude 73 instead of one having an amplitude 70. Accordingly, such apparatus would be caused to operate in such a manner as to set a false D.-C. or black level for the operation of the tri-color kinescope 46.

Reference now will be made to Figure 3 of the drawings for a description of an illustrative embodiment of the color and burst signal gates and the operation thereof in accordance with the present invention. The color signal gate 24 includes an electron tube 74 which preferably is of a pentode type, such as shown. Accordingly, it is provided with a signal input grid 75, a signal output anode 76, a cathode 77 and a control grid 78. The signal grid 75 may be the No. 1 grid of such a tube, as conventionally employed. The control grid 78 preferably is the screen grid of the pentode 74. Also, the color signal gate tube includes a suppressor grid 79 which may be connected to the cathode 77 in the customary manner.

The composite television signal derived from the video amplifier terminal 20, previously described, is impressed by means including a coupling capacitor 80 and a grid resistor 81 upon the signal grid 75 of the color signal gate tube 74. This tube normally is in a conductive state by reason of the biasing thereof so that the signal which is impressed upon the input grid 75 is transferred to the output circuit including the anode 76 during those periods in which the tube is in its conductive state.

The circuit connected to the cathode 77 of the color signal gate tube 74 includes a resistor 82. This resistor also is connected in the cathode circuit of an electron tube 83 forming part of the burst signal gate 60. The control grid of the burst signal gate tube is connected as shown to the terminal 59 of the first video amplifier stage so that the composite television signal is impressed thereon. The anode of the burst signal gate tube is connected to a load circuit which includes the primary winding 84 of a burst signal output transformer 85. The secondary winding 86 of this transformer is connected to the input terminal 61 of the phase detector 62 of Figure 1.

By reason of the described cathode intercoupling of the color and burst signal gate tubes 74 and 83, respectively, the normal conductive state of the color gate tube 74 causes enough current to flow through the common cathode resistor 82 to bias the burst gate tube 83 to a nonconductive state. Consequently, during normal operation, the color signal gate tube 74 amplifies the chrominance signal and transfers it to the output terminal 25 by means including the band pass filter 23 for impression upon the synchronous demodulator 26 of Figure 1. Also, during these periods of normal operation, no amplification of the composite television signal nor any part thereof is effected by the burst gate tube 83. Consequently, there is no signal impressed upon the phase detector input terminal 61.

The control grid 78 of the color signal gate tube 74 is coupled by means including a capacitor 87 to the winding 57 of the horizontal deflection output transformer 55 of Figure 1. Accordingly, the flyback pulses 58 developed in the auxiliary winding 57 are impressed upon the control grid 78 of the color signal gate tube in negative polarity and in sufficient amplitude to cut off the color gate tube so as to establish a non-conductive state thereof.

It may be that, as a result of the particular type of automatic frequency control system employed in conjunction with the horizontal deflection apparatus, the flyback pulses 58 occur earlier than the burst reception periods. In such a case, it is necessary to provide facilities for controlling the cut-off of the color signal gate tube 74 to coincide with the burst reception periods. One comparatively simple facility of this sort is an integrating network. In the present instance, the flyback pulses 58 may be suitably shaped by integration thereof by an integrating network which includes a resistor 88 and a capacitor 89. In such a case, the capacitor 89 also serves to by-pass the screeen grid 78 of the tube 74 for the chrominance signal.

The described cut-off of the color signal gate tube 74 lowers the voltage developed across the common cathode intercoupling resistor 82 sufficiently to change the state of the burst signal gate tube 83 to a conductive one. In order for the described apparatus to operate in a highly satisfactory manner as described, it is desirable to provide a capacitor 90 which effectively by-passes the cathode-resistor 82 for the chrominance signals but not for the flyback pulses 58.

The overall operation of the color and burst signal gates 24 and 60 is effected in the following manner, reference being had in greater detail to the different components of the composite television signal which are to be controlled by the gating operations. The composite signal 91 includes a video signal component 92, a horizontal synchronizing pulse 93 and a color synchronizing sub-carrier wave burst 94. Such a signal is impressed simultaneously upon the input circuits of the gate tubes 74 and 83. During normal operation, the portions of the composite signal which are impressed upon the color gate tube 74 are transferred to the output terminal 25. During these normal periods of operation, no signal is transferred to the phase detector input terminal 61 because of the non-conductive state of the burst signal gate tube 83. However, during the periods in which the burst signal is received, the color gate tube 74 is rendered nonconducting so that no signal is transferred to the output terminal 25. Accordingly, a modified composite signal 91' with the burst removed is developed at the output terminal 25. However, the burst signal gate tube 83 is operated to a conductive state so that the separated burst 94' is developed at the phase detector input terminal 61.

Figure 4:
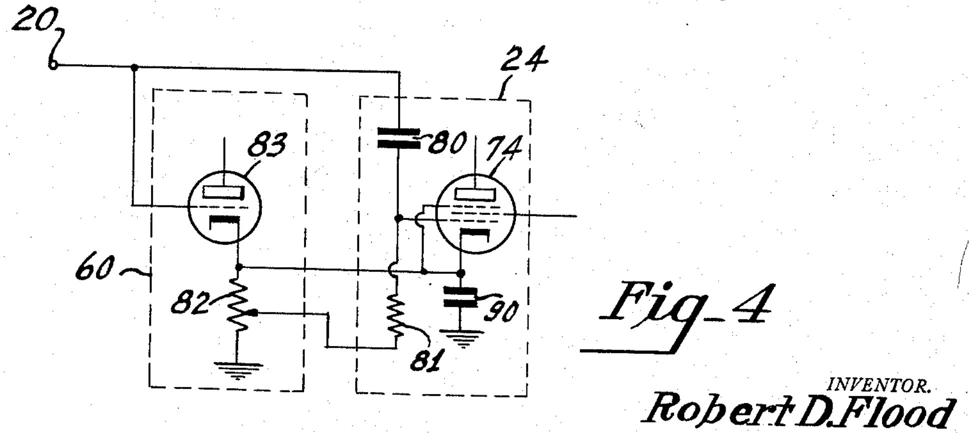

The manner in which the composite television signals are impressed upon the respective color and burst signal gate tubes 74 and 83 is not necessarily restricted to the use of independent circuits as shown in Figure 3. Figure 4, to which reference now will be had, illustrates a somewhat different and equally satisfactory circuit arrangement for impressing the composite television signals upon the two gating devices. In this instance, the input grids of the gate tubes 74 and 83 both are coupled to the terminal 20 of the third video amplifier stage of Figure 1. It will be understood that the signal may be derived from any other convenient points of the video signal amplifier if desired. In this particular circuit arrangement, it may be found desirable to connect the low potential end of the grid resistor 81 to an intermediate point on the common cathode resistor 82 instead of to ground as previously indicated. It will be understood that the apparatus of Figure 4 operates in substantially the same manner as that of Figure 3 to prevent the burst from reaching the demodulating apparatus and for transferring only the burst to the automatic frequency control apparatus.

It may be seen that there is provided by this invention a relatively simple and inexpensive apparatus by means of which to separate the burst for automatic frequency control purposes and to prevent the burst from being synchronously demodulated and, thus, possibly causing false operation of the black level-setting apparatus. At the same time, this apparatus is effective to produce independent amplification of the burst and chrominance signals. An improved burst-separating operation is achieved by cutting off the pentode color signal gate tube 74. A sharper and flatter keying pulse for the operation of the burst gate tube 83 is thus obtained. In this way, a cleaner burst separation may be effected with a greater degree of noise immunity.

Having described apparatus illustratively embodying the invention, its scope is pointed out in the following claims.

What is claimed is:

1. In a color television system employing a composite signal comprising a subject-representative video signal component including a color video signal-modulated subcarrier wave and a synchronizing signal component including deflection control signals and burst of unmodulated color subcarrier wave following said deflection control signals, a signal receiver comprising, means to synchronously demodulate said color video signal-modulated subcarrier wave, means including a normally conductive color signal gate to impress said color video signal-modulated subcarrier wave upon said synchronous demodulating means, signal-controlled means operative during burst reception periods to render said color signal gate non-conductive, frequency control means responsive to said bursts to maintain synchronous operation of said demodulating means, means including a normally nonconductive burst signal gate operative to impress said bursts upon said frequency control means, and biasing means for said burst signal gate coupled to both of said signal gates and responsive to a conductive state of said color signal gate to render said burst signal gate nonconductive and responsive to a non-conductive state of said color signal gate to render said burst signal gate conductive.

2. In a color television system employing a composite signal comprising a subject-representative video signal component including a color video signal-modulated subcarrier wave and a synchronizing signal component including deflection control signals and bursts of unmodulated subcarrier wave following said deflection control signals, a signal receiver comprising, means to synchronously demodulate said color video signal-modulated subcarrier wave, frequency control means responsive to said bursts to maintain synchronous operation of said demodulating means, a color signal gate electron tube having an input grid, an output anode, a cathode and a control grid, means impressing said composite signal upon said color gate input grid, means coupling said color gate tube output anode to said demodulating means, means normally biasing said color gate tube for conduction to impress said color video signal-modulated subcarrier wave upon said demodulating means, a source of control pulses simultaneous with said bursts, means coupling said control pulse source to said control gate tube control grid to render said color gate tube nonconductive, a burst signal gate electron tube having an input grid, an output anode and a cathode, means impressing said composite signal upon said burst gate tube input grid, means coupling said burst gate tube output anode to said frequency control means, and biasing means for said burst signal gate coupled to the respective cathodes of said color and burst gate tubes and responsive to a conductive state of said color signal gate to render said burst signal gate non-conductive and responsive to a nonconductive state of said color signal gate to render said burst signal gate conductive.

3. A color television receiver as defined in claim 2 wherein, said biasing means includes a resistor connected to the respective cathodes of said color and burst gate tubes.

4. A color television receiver as defined in claim 3 wherein, said biasing means includes a capacitor of such a character and connected in such a manner as to bypass said resistor for said color video signal-modulated subcarrier wave but not for said control pulses.

5. A color television receiver as defined in claim 2 wherein, said source of control pulses comprises a generator of deflection flyback pulses.

6. In a color television system employing a composite signal comprising a subject-representative video signal component including a color video signal-modulated subcarrier wave and a synchronizing signal component including deflection control signals and bursts of unmodulated subcarrier wave following said deflection control signals, a signal receiver comprising, means to synchronously demodulate said color video signal-modulated subcarrier wave, frequency control means responsive to said bursts to maintain synchronous operation of said demodulating means, a color signal gate electron tube having an input grid, an output anode, a cathode and a control grid, means impressing said composite signal upon said color gate tube input grid, means coupling said color gate tube output anode to said demodulating means, means normally biasing said color gate tube for conduction to impress said color video signal-modulated subcarrier wave upon said demodulating means, a burst signal gate electron tube having an input grid, an output anode and a cathode, means impressing said composite signal upon said burst gate tube input grid, means coupling said burst gate tube output anode to said frequency control means, an intercoupling resistor connected to the respective cathodes of said color and burst gate tubes, whereby conduction and non-conduction in said color gate tube causes non-conduction and conduction respectively in said burst gate tube, a capacitor connected in shunt with said resistor and of such a character as to by-pass said color video signal-modulated subcarrier wave but not said control pulses, a source of deflection flyback pulses, and means including an integrating network coupling said pulse source to said color gate tube control in a manner to render said color gate tube non-conductive, whereby to cause said intercoupling resistor to render said burst gate tube conductive.

References Cited in the file of this patent

UNITED STATES PATENTS 2,418,112 De Rosa ---------------- Apr. 1, 1947
2,482,782 Lenny et al. ------------ Sept. 27, 1949
2,572,912 Bucher ----------------- Oct. 30, 1951
2,743,311 Richman --------------- Apr. 24, 1956

FOREIGN PATENTS 141,257 Australia -------------- May 16, 1951